United States Patent [19]

Vriens

[11] Patent Number: 4,882,617
[45] Date of Patent: Nov. 21, 1989

[54] PROJECTION DEVICE AND ASSOCIATED ELECTRO-OPTIC MONOCHROME DISPLAY DEVICE WITH PHOSPHOR LAYER AND INTERFERENCE FILTERS

[75] Inventor: Leendert Vriens, Eindhoven, Netherlands

[73] Assignee: U.S. Philips Corporation, New York, N.Y.

[21] Appl. No.: 134,433

[22] Filed: Dec. 17, 1987

[30] Foreign Application Priority Data

Dec. 24, 1986 [NL] Netherlands .................... 8603299

[51] Int. Cl.$^4$ .............................................. H04N 9/31
[52] U.S. Cl. ...................................... 358/60; 362/293; 350/345; 358/253
[58] Field of Search ................ 358/60, 59, 56, 64, 358/253; 362/293, 84; 313/461, 466, 474; 350/339 F, 404, 163, 345

[56] References Cited

U.S. PATENT DOCUMENTS

| 2,858,363 | 10/1958 | Kazan | 358/59 |
| 3,483,416 | 12/1969 | Vermeulen | 313/466 |
| 3,950,078 | 4/1976 | Zatsky | 350/345 |
| 4,132,919 | 1/1979 | Maple | 313/466 |
| 4,167,307 | 9/1979 | Cirkler et al. | 350/345 |
| 4,264,147 | 4/1981 | Baur et al. | 350/345 |
| 4,540,914 | 9/1985 | Maple | 313/466 |
| 4,634,926 | 1/1987 | Vriens et al. | 358/253 X |
| 4,647,812 | 3/1987 | Vriens et al. | 358/253 X |

FOREIGN PATENT DOCUMENTS

| 2619368 | 11/1977 | Fed. Rep. of Germany | 350/345 |
| 2625864 | 12/1977 | Fed. Rep. of Germany | 350/345 |
| 61-272721 | 12/1986 | Japan | 350/339 F |

Primary Examiner—James J. Groody
Assistant Examiner—Mark R. Powell
Attorney, Agent, or Firm—John C. Fox

[57] ABSTRACT

A projection device features at least one monochrome display device including electro-optic means defining a pattern for display, a monochrome luminescent layer, a first interference filter for reflecting the luminescent emission forward toward a display screen, and a second interference filter for obtaining a limited transmission angle for the desired spectral output.

38 Claims, 2 Drawing Sheets

PROJECTION DEVICE AND ASSOCIATED ELECTRO-OPTIC MONOCHROME DISPLAY DEVICE WITH PHOSPHOR LAYER AND INTERFERENCE FILTERS

CROSS REFERENCE TO RELATED APPLICATION

Co-pending application Ser. No. 134432, filed simultaneously with and assigned to the same assignee as this application, relates to an electro-optic color display device with a phosphor layer and associated interference filter.

BACKGROUND OF THE INVENTION

The invention relates to a projection device comprising a projection screen, at least one radiation source and at least one monochrome display device for operation in the transmission mode, the display device comprising electro-optical means between two parallel substrates provided with drive means to cause the electro-optical means to change its transmission state at least locally and to define a pattern in the electro-optical means, projection means for projecting the pattern onto the projection screen.

The electro-optical means may be one of the many liquid crystalline materials, but alternatively the display device may be an electroscopic display.

The invention also relates to a display device and to an illumination source, both of which can be used in such a projection device, but which are alternatively usable for other applications.

It has been proposed quite frequently to replace the cathode ray tube in projection television devices with other display elements such as, for example LCD's. An example of such a device is given in the article "LCD Fullcolor Video Projector," by S. Morozumi et al., in SID '86, Digest, pages 375-378. The device shown in this article has a white light source, two dichroic mirrors, three LCD-display elements (light valves), one dichroic prism and a projection lens with an associated screen. The light from the source is split into three sub-beams (red, green, blue) and each beam passes an associated liquid crystal cell which serves as a light switch. After traversing the light switches, the three sub-pictures thus obtained are combined and imaged on the projection screen.

A problem in such a projection device is that the white light source has a wide spectrum of emitted radiation. In the optical set-up of the system, this gives rise to an incomplete split-up into the three primary colours (red, green, blue) and to chromatic aberration in the image on the projection screen.

It is an object of the invention to obviate these drawbacks.

SUMMARY OF THE INVENTION

To this end a projection device according to the invention is characterized in that: the display device is provided with a layer of material luminescing in one colour, which material can be excited by radiation from the radiation source, a first interference filter is arranged between the radiation source and the layer of luminescent material, which filter substantially completely passes radiation suitable for excitation and substantially completely reflects radiation generated in the luminescent material and a second interference filter is arranged on the other side of the layer of luminescent material, which filter has a high transmission for light of the desired spectral characteristic (spectral lines or spectral band) and in which the reflection considerably increases for light rays of the desired spectral characteristic extending at an angle of more than 20° to 35° to the normal on the filter. Such a device has a high light output (>85%) and passes light of the desired spectral lines at small angles, whereas light of unwanted spectral lines cannot emanate at all due to the action of the second filter.

For colour display, such a projection device comprises two or more, preferably three monochrome display devices, each with a material luminescing in a different colour and each with an optical axis extending perpendicularly from the centre of the display portion of the display device. Preferably, the optical axes of the three display devices are co-planar, the axes of the first and second display devices coincide, and the axis of the third display device constituting the principle axis of the projection device, said axis being perpendicular to the two coincident axes The device also comprises dichroic prisms reflecting the images of the first and second display devices in the direction of the screen along the principal axis and passing the image of the third display device in the direction of the screen along the principal axis.

Instead of dichroic prisms, the device may alternatively comprise two plane dichroic reflecting mirrors intersecting each other and extending perpendicularly to the said plane and through the point of intersection of the axes, each mirror extending at an angle of 45° to the principal axis, the first mirror reflecting the image of the first display device and the second mirror reflecting the image of the second display device in the direction of the screen along the principal axis and both mirrors passing the image of the third display device in the direction of the screen along the principal axis.

The first interference filter is used to prevent loss of light due to emission and dispersion in the luminescent layer in the direction of the radiation source, as has been further described in commonly assigned co-pending application Ser. No. 134432, filed simultaneously herewith.

As described in that application the first interference filter and the luminescent layer, viewed from the radiation source, may be arranged either in front of or behind the liquid crystalline material; in the latter case the liquid crystalline material serves as a switch for the radiation emitted by the source.

The use of luminescent material, in combination with the second interference filter, has the advantage that (sub)pictures are obtained which are substantially entirely monochromatic so that there is little chromatic aberration and no lens corrections are required. In addition the dichroic prisms or mirrors arranged at an angle of 45° function very satisfactorily for this monochromatic light.

By providing the second interference filter a limited transmission angle is obtained for the desired spectral lines or band, while in addition the reflection in the direction of the luminescent layer considerably increases for light rays extending at an angle of more than 20° to 35° to the normal on the filter. At larger angles up to 90° there is substantially no transmission.

The light reflected at these larger angles is dispersed by the luminescent layer. A part thereof returns at smaller angles and can still contribute to the light output; by arranging such a second interference filter a light output gain by a factor of 1.8 to 2.4 is achieved in this application.

In projection television devices with dichroic mirrors and interference filters having such a considerably limited transmission angle, there is not only a gain in brightness by a factor of 1.8 to 2.4 but also a gain in contrast by a factor of more than 2 and also a considerable colour improvement because the second interference filter also ensures a spectral of, particularly filtering long-wave spectral components. If there are no interference filters, these long-wave spectral components are not correctly reflected by the dichroic mirrors (for the blue component) or passed (for the green component), which leads to a colour variation across the projection screen and also to a loss of contrast via multiple reflections. When using interference filters in combination with the dichroic prisms or mirrors, this problem is prevented or is reduced to a considerable extent.

The second interference filter preferably has a number of layers (at least 9, but preferably 14) consisting alternately of a material having a high refractive index and of a material having a low refractive index, each with an optical thickness nd in which n is the refractive index of the material and d is the thickness of the layer. This optical thickness nd is between 0.2 $\lambda_f$ and 0.3 $\lambda_f$, in which $\lambda_f$ is the central wavelength of the filter and is equal to $p \times \lambda$, where $\lambda$ is the central wavelength of the relevant display device and p is a number between 1.16 and 1.30. The average optical thickness is 0.25 $\lambda_f$. The filter thus comprises exclusively or substantially exclusively layers having an optical thickness of approximately 0.25 $\lambda_f$. This gives the filter the special property of the very broad reflection band (no transmission) for light rays which extend at an angle of between 20° to 35° and 90° to the normal on the filter. The layer thicknesses in the filter according to the invention are thus chosen to be such that at a desired wavelength the reflection starts to increase considerably for light rays from the luminescent material which extend at an angle of more than 20° to 35° to the normal on the filter. The broad refection band ensures that light rays extending at angles of more than 20° to 35° are reflected as much as possible and, after dispersion in the luminescent material, again get a chance to emanate in the forward direction, that is to say within an angle of at most 20° to 35° to the normal on the filter. Consequently, a maximum light output in the forward direction is produced, which is at least 60% larger than without use of the filter. In addition the broad reflection band ensures that the halo effect is greatly reduced and that light emanates to a smaller extent at large angles.

The optical thickness nd is preferably not equal for all layers but varies between 0.2 $\lambda_f$ and 0.27 $\lambda_f$. Due to this variation in thickness a flatter response characteristic of the filter is obtained. Since the response characteristic of the filter is wavelength-dependent, a combination of the relevant phosphor and an adapted filter provides the possibility of improving the colour point of the light rays which traverse the filter within an angle of 20° to 35° to the normal.

There are various possibilities for the first interference filter. For example, it is possible to choose a so-called "all-dielectric" multilayer filter comprising at least 6 but preferably 9 to 30 layers, alternately having a high and a low refractive index. A sufficiently broad reflection bandwidth for one colour can be obtained with this number of layers. An advantage is that there is no absorption in the filter, provided that the materials chosen are transparent both to the exciting and to the generated radiation.

On the other hand a "metal-dielectric" filter may be chosen, comprising only 3 to 5 layers of alternate metal and dielectric material layers.

Various choices are also possible for the phosphors. When using a radiation source based on predominantly long-wave UV-radiation, for example 360–380 nanometers, a ZnS:Ag-blue phosphor; a (Zn, Cd)S:Cu, Ag-green phosphor, and a $Y_2O_2S$:Eu-red phosphor are suitable.

When using a radiation source based on the 254 nm Hg-resonance line, the following combination is very satisfactory:

$BaMg_2Al_{16}O_{27}$:Eu as a blue phosphor (maximum emission at 450 nm);

$CeMgAl_{11}O_{19}$:Tb as a green phosphor (maximum emission at 545 nm);

$Y_2O_3$:Eu as a red phosphor (maximum emission at 612 nm).

The associated emission wavelengths of these phosphors are suitable for the maximum sensitivity of each of the three colour receptors of the eye, making possible the production of an eminent colour display.

The invention also relates to a monochrome display device which is particularly but not exclusively suitable for use in the projection device described. Such a device may also by used, for example data graphic displays.

The invention also relates to an illumination source having a radiation source in a holder bounded by at least a flat wall, characterized in that the wall is at least locally provided with a layer of luminescent material which can be excited by radiation from the radiation source, and in that a first interference filter is arranged between the radiation source and the layer of luminescent material, which filter substantially completely passes radiation suitable for excitation and substantially completely reflects radiation generated in the luminescent material, and in that a second filter is arranged on the other side of the layer of luminescent material, which filter has a high transmission for light of the desired spectral lines or spectral band which is emitted by the luminescent layer at small angles to the normal on the filter and in which the reflection considerably increases for light rays of the said spectral lines or band which extend at an angle of more than 20° to 35° to the normal on the filter.

Consequently, a light source can be obtained which emits light of a desired colour (determined by spectral lines or band) at a limited angle. Besides its use as a separate light source for the projection LCD-TV described, such a light source may also be used in, for example direct-view display devices in which a small viewing angle is sufficient.

BRIEF DESCRIPTION OF THE DRAWINGS

The invention will now be described in greater detail with reference to the accompanying drawings in which.

DESCRIPTION OF THE PREFERRED EMBODIMENTS

Figure 1:
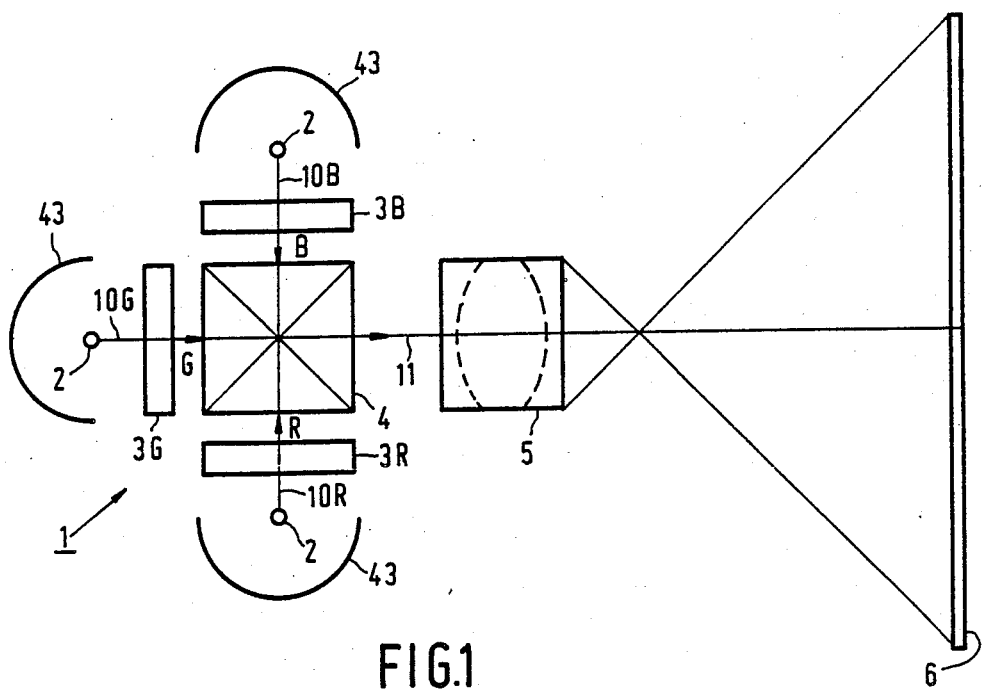
FIG. 1 shows diagrammatically one embodiment of a projection device according to the invention.

FIG. 1 shows diagrammatically a projection device 1 having three radiation sources 2, mirrors 43, and monochrome display devices 3 in which a red (3R), a green (3G) and a blue (3B) picture are generated. The three pictures are imaged via dichroic prisms 4 and a lens 5 on a screen 6, on which they register in such a manner that an overall colour picture is obtained.

The axes of the display devices 3B and 3R coincide and are perpendicular to the axis 11 of the display device 3G, which also consitutues the principle axis of the projection device. The pictures from the display devices 3B and 3R may not only be imaged on the screen 6 by means of prisms 4, but alternatively by means of two plane dichroic mirrors which intersect each other, at an angle of 45° to the axis 11, and extend perpendicularly to the plane of the axes of the display device through the point of intersection of the axes.

According to the invention, radiation sources 2 emit radiation 10 (in this embodiment UV radiation), which is shown as a single line, but is actually incident through a wide angle range and has such a wavelength that it can excite phosphors present in the display devices 3. The radiation sources 2, for example high-pressure mercury lamps, need not be entirely identical. The gas fill of the lamps may be adapted in such a manner that the emission spectrum of each lamp satisfactorily suits its associated phosphor layer, for example UV radiation for the blue phosphor, blue light for the green phosphor and blue or blue-green light for the red phosphor.

Where all sources 2 emit long-wave UV radiation, the following phosphors are satisfactory: ZnS:Ag (blue), (Zn, Cd)S:Cu, Ag (green) and $Y_2O_2S$:Eu (red).

Figure 2:
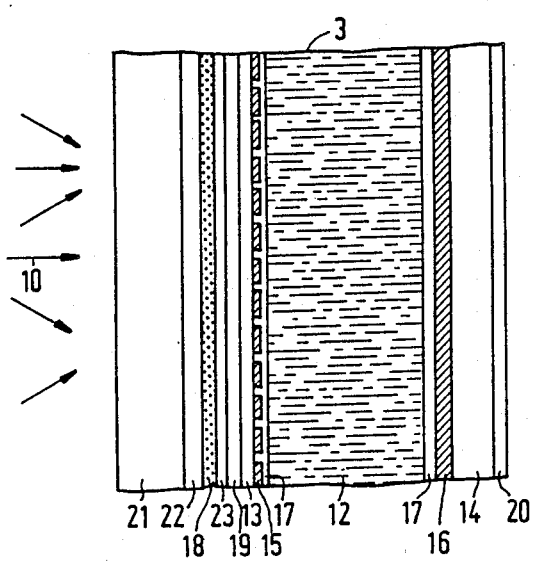
FIG. 2 is a diagrammtic cross-section of a first embodiment of a display device for use in a projection device according to the invention.

FIG. 2 shows diagrammatically one of the display devices 3, in this embodiment a liquid crystal display device having a liquid crystal 12 as an electro-optical medium which is present between two parallel transparent substrates 13, 14 of, for example, glass. Transparent stripshaped electrodes 15, 16, of, for example, tin oxide, define a matrix of switching points on these substrates. The electrodes are coated with a layer of orienting material 17 of, for example, silicon oxide. The display device also comprises a polariser 19 and an analyser 20. The assembly is secured to a support 21. This support must be transparent to radiation from the radiation source 2, and will be made of, for example, quartz when using short-wave UV radiation. Normal glass instead of quartz glass may be chosen for a radiation source having a longer wavelength (350-390 nm) in the embodiments of FIGS. 2 and 3.

According to the invention the display device 3 has a phosphor layer 18 which, dependent on the type of phosphor used, emits red, green or blue light upon excitation by radiation 10 suitable for this purpose. A first interference filter 22 is arranged in the radiation path in front of the phosphor layer 18, which filter substantially completely passes the radiation 10 and substantially completely reflects the light generated in the phosphor layer. Thus, light generated in the phosphor layer 18 which would otherwise leave the phosphor layer 18 on the side of the filter 22 is reflected by this layer 22 and thus contributes to the overall light output. In this way a greater brightness (2 to 3 times) is obtained than if the interference filter 22 were not provided.

According to the invention the device comprises a second interference filter 23 having such a composition that the colour generated in the phosphor layer 18 is passed at a limited transmission angle. The use of such a filter not only leads to a gain in light output but also to an improvement of colour purity and contrast.

Various materials may be chosen for the liquid crystalline material 12. For example, use can be made of the so-called twisted nematic materials, but materials whose effect is based on birefringence such as described in EP 0,131,216 (270°-twist) or in DE 34,31,871 (180°-twist), or ferro-electric liquid crystals are alternatively suitable.

Various types of known LCD devices may be used, such as TN-LCD, SBE, HBE, FELCD, as well as for other electro-optical display devices used in the transmission mode, such as (dry) electroscopic displays.

Figure 3:
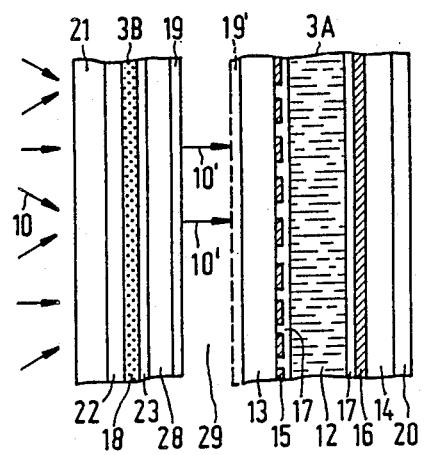
FIG. 3 is a diagrammatic cross-section of a modification of the device of FIG. 2.

FIG. 3 shows diagrammatically a modification of the device of FIG. 2 in which the display device is divided into a part 3A accommodating the liquid crystal 12 and the electrodes 15, 16 with the associated intermediate layers, and a part 3B in which radiation 10 incident at a wide angle range is converted into visible substantially monochromtic radiation 10' with a small angle range in the direction of propagation. The part 3B accommodates the fluorescent layer 18 and the interference filters 22, 23 between supports 21 and 28. The polariser (19 on the part 3B) may optionally be provided on the part 3A (19' in phantom). The structure shown has the advantage that heat generated in the fluorescent layer 18 is less likely to produce a higher temperature in the liquid crystal 12. The insulating effect can be enhanced by cooling the gap 29 between the parts 3A and 3B for example by means of a suitably transparent coolant.

The reference numerals for the remaining components have the same significance as those in FIG. 2.

Figure 4:
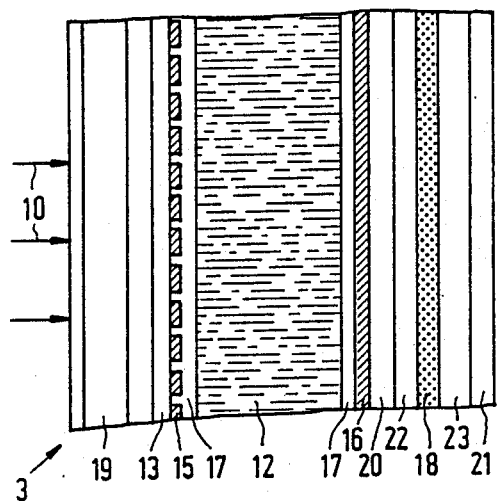
FIG. 4 is a diagrammatic cross-section of a second embodiment of such a display device.

FIG. 4 shows a further embodiment of a device according to the invention. The liquid crystal material 12 now functions as a switch for the exciting radiation, for example UV radiation, and the phosphor pattern layer 18 is on the other side. The liquid crystal material and the wavelength used may be optimized in such a way that a maximum contrast is achieved. In one embodiment the liquid crystal is ROTN3010 from Hoffmann-Laroche and the wavelength of the exciting radiation 10 is approximately 370 nanometers. The cell structure of this liquid crystal is such that a twist of the director of approximately 270° (SBE-cell) occurs between the surfaces of the two orientation layers 17. In this embodiments the polariser 19 and the analyser 20 are now suitable for UV radiation, and the substrate 13 is transparent to UV radiation. In addition the radiation 10 must now be substantially parallel. If desired an extra glass plate (transparent to UV radiation) can be arranged between the analyser 20 and the interference filter 22. The analyser 20 and the filter 22 may also change places.

Figure 5:
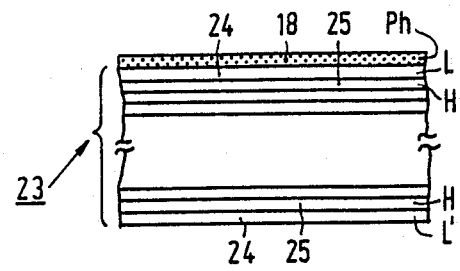
FIG. 5 is a diagrammatic cross-section of an interference filter.

FIG. 5 shows a filter 23 consisting of alternate layers 24 of low refractive index (denoted by the leters L and L'), and layers 25 of high refractive index (denoted by the letter H), adjacent phosphor layer 18 (Ph). By way of example, a 20-layer filter consists of layers 24 (SiO$_2$) (refractive index n=1.47) and layers 25 (TiO$_2$) (n=2.35)). The layers have a thickness of approximately 0.25 $\lambda_f$. The last layer 25 is coated with a 0.125 $\lambda_f$ thick terminal layer 24 (L'). Where the phosphor 18 is green emitting either a Tb-activated phosphor with a central wavelength $\lambda$=545 nm or Mn-activated willemite (Zn$_2$SiO$_4$:Mn) with $\lambda$=535 nm, at p=1.20, $\lambda_f$ will be equal to 654 nm for Tb-activated phosphor and 642 nm for willemite. The values of nd/$\lambda_f$ of the filter layers is shown in the following Table:

| Layer number | n | n.d/$\lambda_f$ |
|---|---|---|
| phosphor | | |
| 1 | L | 0.131 |
| 2 | H | 0.260 |
| 3 | L | 0.257 |
| 4 | H | 0.254 |
| 5 | L | 0.251 |
| 6 | H | 0.249 |
| 7 | L | 0.247 |
| 8 | H | 0.246 |
| 9 | L | 0.245 |
| 10 | H | 0.245 |
| 11 | L | 0.244 |
| 12 | H | 0.245 |
| 13 | L | 0.245 |
| 14 | H | 0.246 |
| 15 | L | 0.247 |
| 16 | H | 0.249 |
| 17 | L | 0.251 |
| 18 | H | 0.254 |
| 19 | L | 0.257 |
| 20 | H | 0.260 |

Generally the filters 22 have at least 6 but preferably 9 to 30 layers alternately having a low refractive index and a high refractive index. For the layers having a low refractive index, for example magnesium fluoride (MgF$_2$) or silicon oxide (SiO$_2$) is chosen, which materials are suitable for all wavelengths. For the layers having a high refractive index hafnium oxide (HfO$_2$) is suitable for all wavelengths, zirconium oxide (ZrO$_2$) is suitable for $\lambda$>350 nm, and the materials titanium oxide (TiO$_2$), tantalum oxide (Ta$_2$O$_5$) and niobium oxide (Nb$_2$O$_5$) are suitable for $\lambda$>370 nm. The choice also depends on the choice of the radiation source.

Figure 6:
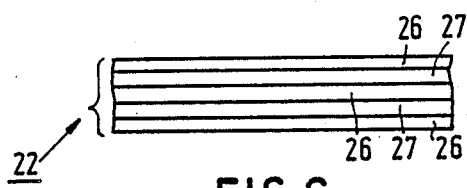
FIG. 6 is a modification thereof.

The filter 22 may be an "all dielectric" filter (see FIG. 5) but may also be a "metal-dielectric" filter (see FIG. 6) of 3-5 layers, in this embodiment 5 layers, alternately a metal layer 26 and a dielectric layer 27. Both filters 22 and 23 may be manufactured by means of electron beam vapour-deposition techniques, while filter of FIG. 6 may also be obtained by means of sputtering.

Instead of a long-wave UV source, an UV source which directly emits the 254 nm Hg resonance line may be chosen (for example a low-pressure mercury lamp with a quartz envelope). Although at this wavelength quartz must be chosen for the substrate 13 in the devices of FIGS. 2, 3, very efficient phosphors for the display of blue, green and red at this wavelength are known, such as:

BaMg$_2$Al$_{16}$O$_{27}$:Eu as a blue phosphor, $\lambda_{max}$=450 nm;

CeMgAl$_{11}$O$_{19}$ Tb as a green phosphor, $\lambda_{max}$=545 nm;

Y$_2$O$_3$:Eu as a red phosphor, $\lambda_{max}$=612 nm.

Figure 7:
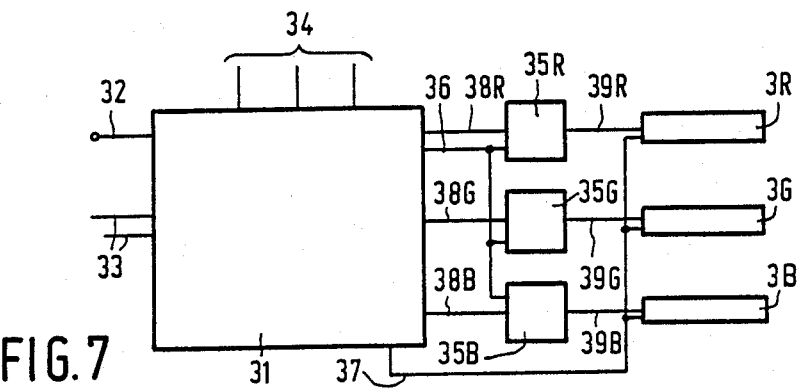
FIG. 7 shows diagrammatically a drive circuit for such a device.

FIG. 7 shows diagrammatically a drive unit 31 for processing signals for a projection device as described above. The drive unit 31 which is fed via one or more terminals 33, receives, for example a video signal via an input 32. Dependent on the state of the drive unit, which can be adjusted by means of control signals 34, sub-signals are applied for the three sub-colours to the sub-drive units 35 (35B, 35G and 35R, respectively) via signal lines 38 (38B, 38G and 38R). The sub-drive units 35 drive the display devices 3 by means of signal lines 9. For the purpose of mutual synchronisation, synchronising and clock signals are generated in the drive unit 31, which are applied via synchronising lines 36 and clock lines 37 to the sub-drive units 35 and the display devices 3, respectively.

Figure 8:
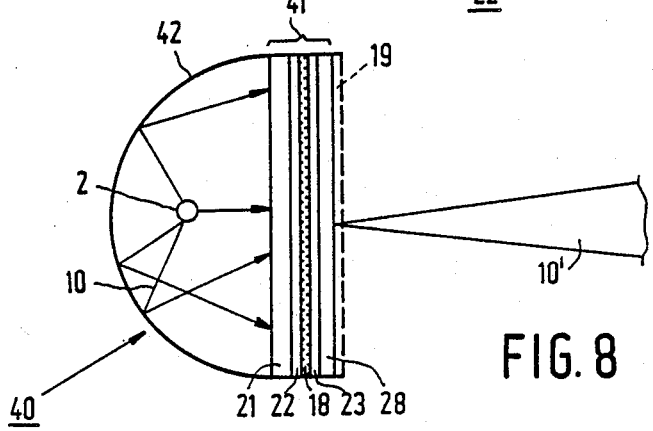
FIG. 8 shows diagrammatically an illumination source according to the invention.

Finally, FIG. 8 shows in a cross-section an illumination source 40 according to the invention which can be used, for example in the device of FIG. 3 but also in other devices in which light having given properties (spectral properties, limited angle range, polarisation) is desired.

The radiation source 2 is present in a space having a structure 41 constituting a flat wall on one side, while the radiation 10 emitted by the source 2 is incident on the flat wall structure 41 at different angles via a second, reflective, wall 42 which is, for example convex or cylindrical. The flat wall structure 41 has a phosphor layer 18 between two interference filters 22, 23 and supports 21, 28 having similar properties as described with reference to the previous embodiments. If necessary, a polariser 19 may be provided on the outside of wall 41. Radiation emitted by the source 2 (for example UV radiation) is converted by this combination into long-wave light 10' having a small angle range, while the interference filter 23 provides a possibility of a very satisfactory colour selection with a light output increased by a factor of 1.8 to 2.4. Since the use of the interference filter 22 increases the light output by a factor of 2 to 3, the gain in light output with respect to a similar device without interference filters is a factor of 4 to 7. This also applies if the combination of phosphor and interference filters is directly provided on a liquid crystal or other electro-optical device.

The invention is of course not limited to the embodiments described herein. Several variations within the scope of the invention are possible. For example, as already stated, the dichroic prism 4 may be replaced by a set of dichroic mirrors extending at an angle of 45° to the axis 11.

Projection systems using one common UV source 2 are also possible. In the device of FIG. 8 the phosphor layer 18 may be split up into 3 sub-layers each producing light emitted in a different colour, the sub-beams 10' (for example red, green and blue) being led via different optical paths to associated electro-optical elements. In that case the wall 41 need not be planar but may consist of, for example three different parts which extend at a given angle with respect to one another. However, separate interference filters should then be used for each colour.

What is claimed is:

1. A projection device comprising: a projection screen, at least one radiation source; at least one monochrome display device for operation in the transmission mode, the display device comprising an electro-optical means, two parallel substrates flanking the electro-optical means and provided with drive means to cause the electro-optical means to change its transmission state at least locally and to define a pattern in the electro-optical means; and projection means for projecting the pattern onto the projection screen;

characterized in that:
the display device is provided with a layer of material luminescing in one colour, which material can be excited by radiation from the radiation source,
a first interference filter is arranged between the radiation source and the layer of luminescent material, which filter substantially completely passes radiation suitable for excitation and substantially completely reflects radiation generated in the luminescent material; and
a second interference filter is arranged on the other, viewing side of the layer of luminescent material, which second filter has a high transmission for light of the desired spectral characteristic which is emitted by the luminescent layer at small angles to the normal on the second filter, and in which the reflection considerably increases for light rays of said spectral characteristic which extend at an angle of more than 20° to 35° to the normal on the second filter.

2. A projection device as claimed in claim 1, characterized in that the device comprises three monochrome display devices, each with a material luminescing in a different colour and each with an optical axis extending perpendicularly from the center of the display portion of the display device, the optical axes of the three display devices being co-planar and intersecting at a point, the axes of the first and second display devices coinciding and the axis of the third display device constituting the principal axis of the projection device, said principal axis being perpendicular to the two coincident axes.

3. A projection device as claimed in claim 2, characterized in that the device also comprises dichroic prisms arranged to reflect the images of the first and second display devices in the direction of the screen along the principal axis, and to pass the image of the third display device in the direction of the screen along the principal axis.

4. A projection device as claimed in claim 2, characterized in that the device also comprises two plane dichroic reflecting mirrors intersecting each other and extending perpendicularly to the plane and through the point of intersection of the axes, each mirror extending at an angle of 45° to the principal axis, the first mirror reflecting the image of the first display device and the second mirror reflecting the image of the second display device in the direction of the screen along the principal axis, and both mirrors passing the image of the third display device in the direction of the screen along the principal axis.

5. A projection device as claimed in claim 1, characterized in that the layer of luminescent material and the two interference filters, viewed from the radiation source, are arranged in front of the electro-optical means, and in that the electro-optical means comprises a light switch for the radiation generated in the luminescent material.

6. A projection device as claimed in claim 1, characterized in that the device comprises at least one illumination souce having a wall in which the layer of luminescent material and the two interference filters are present, the remainder of the display device being spaced from the illumination source.

7. A projection device as claimed in claim 6, characterized in that a polariser is provided on the outside of the wall of the illumination source.

8. A projection device as claimed in claim 1, characterized in that the electro-optical means, viewed from the radiation source, is present in front of the layer of luminescent material and the two interference filters, and comprises a switch for the radiation exciting the luminescent material.

9. A projection device as claimed in claim 1, characterized in that the electro-optical means comprises a liquid crystalline material.

10. A projection device as claimed in claim 1, characterized in that the first interference filter is a dielectric filter comprising at least six layers alternately having a high and a low refractive index.

11. A projection device as claimed in claim 10, characterized in that the layers having a high refractive index comprise one or more of the materials hafnium oxide ($HfO_2$), zirconium oxide ($ZrO_2$), titanium oxide ($TiO_2$), tantalum oxide ($Ta_2O_5$) or niobium oxide ($Nb_2O_5$), and the layers having a low refractive index comprises one or more of the materials magnesium fluoride ($MgF_2$) or silicon oxide ($SiO_2$).

12. A projection device as claimed in claim 1, characterized in that the first interference filter has 3-5 layers of alternately a layer of metal and a layer of dielectric material.

13. A projection device as claimed in claim 1, characterized in that the second interference filter comprises at least nine layers alternately having a high refractive index and a low refractive index, each layer having an optical thickness nd, in which n is the refractive index of the material of the layer and d is the thickness of the layer, said optical thickness nd being between 0.2 $\lambda_f$ and 0.3 $\lambda_f$, with an average optical thickness of 0.25 $\lambda_f$, where $\lambda_f$ is equal to $p \times \lambda$, $\lambda$ is the central wavelength of the display device, and p is a number between 1.16 and 1.30.

14. A projection device as claimed in claim 13, characterized in that the second interference filter is composed of 9 to 30 layers.

15. A projection device as claimed in claim 14, characterized in that the optical thickness nd is between 0.23 $\lambda_f$ and 0.27 $\lambda_f$.

16. A projection device as claimed in claim 1, characterized in that a high-pressure mercury lamp is used as a radiation source.

17. A projection device as claimed in claim 14, characterized in that the lamp emits radiation at a central wavelength of 254 nanometers and the projection device comprises three display devices, one for each of the colours red, green and blue, the red luminescent layer comprising $Y_2O_3$:Eu red phosphor, the green layer comprising $CeMgAl_{11}O_{19}$:Tb green phosphor, and the blue layer comprising $BaMg_2Al_{16}O_{27}$:Eu blue phosphor, respectively.

18. A projection device as claimed in claim 1, characterized in that a common radiation source is used for the display devices.

19. A monochrome display device for use in a projection device, comprising electro-optical means, two parallel substrates flanking the electro-optical means and provided with drive means to cause the electro-optical means to change its state at least locally, characterized in that: a layer of monochrome luminescent material is provided on one of the substrates; a first interference filter is provided adjacent one side of the luminescent layer, which filter substantially completely passes radiation suitable for excitation of the luminescent material and substantially completely reflects radiation generated in the luminescent material; and a second interference filter is provided adjacent the other side of the luminescent layer, the second filter having a high transmission for light of the desired spectral characteristic which is emitted by the luminescent layer at small angles to the normal on the second filter, and in which the reflection considerably increases for light rays of said spectral characteristic which extend at an angle of more than 20° to 35° to the normal on the second filter.

20. A display device as claimed in claim 19, characterized in that the electro-optical means comprises a liquid crystalline material.

21. A display device as is claimed in claim 19, characterized in that the first interference filter is a dielectric filter comprising at least 6 layers alternately having a high and a low refractive index.

22. A display device as claimed in claim 21, characterized in that the layers having a high refractive index comprise one or more of the materials hafnium oxide ($HfO_2$), zirconium oxide ($ZrO_2$), tantalum oxide ($Ta_2O_5$) or niobium oxide ($Nb_2O_5$) and the layers having a low refractive index comprise one or more of the materials magnesium fluoride ($MgF_2$) or silicon oxide ($SiO_2$).

23. A display device as claimed in claim 19, characterized in that the first interference filter comprises 3 to 5 layers of alternately a layer of metal and a layer of dielectric material.

24. A display device as claimed in claim 19, characterized in that the second interference filter has at least nine layers alternately having a high refractive index and a low refractive index, each layer having an optical thickness nd, in which n is the refractive index of the material and d is the thickness of the layer, said optical thickness nd being between 0.2 $\lambda_f$ and 0.3 $\lambda_f$, where $\lambda_f$ is equal to $p \times \lambda$, $\lambda$ is the central wavelength of the display device and p is a number between 1.16 and 1.30.

25. A display device as claimed in claim 24, characterized in that the second interference filter is composed of 14 to 30 layers.

26. A display device as claimed in claim 25, characterized in that the optical thickness nd is between 0.23 $\lambda_f$ and 0.27 $\lambda_f$.

27. An illumination source comprising a space accommodating a radiation source and bounded by a first flat wall, and a second reflective wall,
characterized in that the first wall is provided with at least one layer of a material luminescing in one colour, which layer can be excited by the radiation source,
and in that a first interference filter is arranged between the radiation source and the layer of luminescent material, which filter substantially completely passes radiation suitable for excitation and substantially completely reflects radiation generated in the luminescent material,
and in that a second interference filter is arranged on the other side of the layer of luminescent material, which second filter has a high transmission for light of the desired spectral characteristic which is emitted by the luminescent layer at small angles to the normal of the second filter, and in which the reflection considerably increases for light rays of the said spectral characteristic which extend at an angle of more than 20° to 35° to the normal on the second filter.

28. An illumination source as claimed in claim 27, characterized in that a polarizer is provided on the side of the second interference filter remote from the luminescent layer.

29. An illumination source as claimed in claim 27, characterized in that the first interference filter is a dielectric filter comprising at least six layers alternately having a high and a low refractive index.

30. An illumination source as claimed in claim 29, characterized in that the layers having a high refractive index comprise one or more of the materials hafnium oxide ($HfO_2$), zirconium oxide ($ZrO_2$), titanium oxide ($TiO_2$), tantalum oxide ($Ta_2O_5$) or niobium oxide ($Nb_2O_5$) and the layers having a low refractive index comprise one or more of the materials magnesium fluoride ($MgF_2$) or silicon oxide ($SiO_2$).

31. An illumination source as claimed in claim 27, characterized in that first interference filter comprises 3 to 5 layers of alternately a layer of metal and a layer of a dielectric material.

32. An illumination source as claimed in claim 27, characterized in that the second interference filter comprises at least nine layers alternately having a high refractive index and a low refractive index, each layer having an optical thickness nd of between 0.2 $\lambda_f$ and 0.3 $\lambda_f$, the average optical thickness being 0.25 $\lambda_f$, where $\lambda_f$ is equal to $p \times \lambda$, $\lambda$ is the central wavelength of the display device, and p is a number between 1.16 and 1.30.

33. An illumination source as claimed in claim 32, characterized in that the second interference filter is composed of 9 to 30 layers.

34. An illumination source as claimed in claim 33, characterized in that the optical thickness nd of the layers is between 0.23 $\lambda_f$ and 0.27 $\lambda_f$.

35. An illumination source as claimed in claim 27, characterized in that a high-pressure mercury lamp is used as the radiation source.

36. An illumination source as claimed in claim 35, characterized in that the luminescent material is selected from the group consisting of ZnS:Ag (blue); (Zn, Cd)S:Cu, Ag (green) and $Y_2O_2S$:Eu (red).

37. An illumination source as claimed in claim 27, characterized in that a lamp emits radiation at a central wavelength of 254 nanometers.

38. An illumination source as claimed in claim 37, characterized in that the luminescent material is selected from the group consisting of $Y_2O_3$:Eu (red); $CeMgAl_{11}O_{19}$:Tb (green) and $BaMg_2Al_{16}O_{27}$:Eu (blue).

* * * * *